(12) United States Patent
Simon et al.

(10) Patent No.: US 6,433,701 B1
(45) Date of Patent: Aug. 13, 2002

(54) INSTRUMENT CLUSTER

(75) Inventors: Ernst-Ulrich Simon, Oberursel; Hans Kolibius, Babenhausen; Georg Nehm, Niedernberg; Stephan Zech, Eltville/Rhein; Hartmut Kronenberg, Nordseebad Burhave, all of (DE)

(73) Assignee: Mannesmann VDO AG, Frankfurt (DE)

( * ) Notice: Subject to any disclaimer, the term of this patent is extended or adjusted under 35 U.S.C. 154(b) by 0 days.

(21) Appl. No.: 09/649,339

(22) Filed: Aug. 28, 2000

(30) Foreign Application Priority Data

Sep. 13, 1999 (DE) .......................................... 199 43 571

(51) Int. Cl.$^7$ ................................................. G08B 5/00
(52) U.S. Cl. ............... 340/815.4; 340/461; 340/815.49; 361/749; 361/803; 439/67; 439/493
(58) Field of Search .......................... 340/815.4, 815.49, 340/459, 438, 815.78, 461, 815.79; 361/386, 400, 377, 403, 759, 644, 645, 681, 749, 743, 748, 750, 751, 803; 116/62.4, 334, 335; 439/493, 77, 67; 174/254, 268; 349/150

(56) References Cited

U.S. PATENT DOCUMENTS

| | | | | |
|---|---|---|---|---|
| 4,304,976 A | * | 12/1981 | Gottbreht et al. | 219/10.55 B |
| 4,954,807 A | * | 9/1990 | Fleischer et al. | 340/459 |
| 5,138,528 A | * | 8/1992 | Altman et al. | 361/400 |
| 5,204,805 A | * | 4/1993 | Takahashi et al. | 361/386 |
| 5,415,124 A | * | 5/1995 | Simon et al. | 116/334 |
| 5,430,612 A | * | 7/1995 | Simon et al. | 361/752 |
| 5,917,149 A | * | 6/1999 | Barcley et al. | 361/803 |

* cited by examiner

Primary Examiner—Jeffery Hofsass
Assistant Examiner—Davetta W. Goins
(74) Attorney, Agent, or Firm—Martin A. Farber

(57) ABSTRACT

An instrument cluster has a rigid printed circuit board (3) on the rear side of a basic (1). On the front side, the basic body (1) is partially covered by a supporting body (10) which is connected in an articulated manner to the basic body (1). A flexible printed circuit board (12) extends over the front side of the basic body (1) and the supporting body (10), the printed circuit board having a connecting region (13) which is deflected by a defined angle with respect to an edge region of the rigid printed circuit board (3) and is connected to this printed circuit board (3) by bow-type soldering (14) for example.

13 Claims, 2 Drawing Sheets

INSTRUMENT CLUSTER

FIELD AND BACKGROUND OF THE INVENTION

The invention relates to an instrument cluster having a basic body which supports a rigid printed circuit board on its rear side and has display regions which run at different angles to one another and at least one of which is at a different level with respect to another display region.

Instrument clusters of the abovementioned type are provided in today's motor vehicles and are therefore generally known. In order to integrate different displays in an optimum manner in the instrument cluster, the central region of the indicator of a speedometer is often covered by a display region on which, for example, a display for a vehicle navigation system is arranged. Further, secondary displays are frequently provided to the side of the speedometer, said displays running at an obtuse angle with respect to the plane of the speedometer so that they can be read in optimum fashion by the driver. Display regions running at different angles and on different levels entail a complicated arrangement and contacting of the different electrical and electronic components of the instrument cluster, and so instrument clusters of this type are substantially more expensive than instrument clusters in which all of the displays are aligned in one plane.

SUMMARY OF THE INVENTION

The invention is based on the problem of designing an instrument cluster of the type mentioned at the beginning in such a manner that in spite of different angular positions and planes of the display regions, the arrangement and contacting of the electrical and electronic components of the instrument cluster are as simple as possible.

According to the invention, this problem are solved by a flexible printed circuit board being arranged on the front side of the basic body, said printed circuit board having a connecting region which is deflected by a defined angle with respect to an edge region of the rigid printed circuit board. The defined angle may, for example, amount to approximately 180°.

This division of the printed circuit board into a rigid printed circuit board and a flexible printed circuit board enables the required electronic and electrical components to be arranged in an optimum manner. Furthermore, the flexible printed circuit board enables even those regions of the instrument cluster which run offset in terms of height and/or angle with respect to the rigid printed circuit board or the basic body of the instrument cluster to be reached without any problems.

The connection between the rigid printed circuit board and the flexible printed circuit board can be produced with little outlay in terms of costs if, according to an advantageous development of the invention, the connecting region is connected to the rigid printed circuit board by bow-type soldering, a conductive bond or zero-force plug. The same is achieved with a rigid/flexible printed circuit board.

The assembly of the component parts of the instrument cluster is particularly simple if the basic body has a web which runs transversely to its main plane of extent and to whose free end a supporting body for a second display region is fastened, for example by means of a hinge. This design enables the supporting body to initially assume a position in which it does not obstruct the assembly of the components on the basic body. Only when the basic body has been completely fitted with the parts which it is to support is the supporting body folded onto the basic body, so that only then are other display planes, positions and/or angular positions of, for example, other elements too produced. The supporting bodies are advantageously locked in place by clips.

The instrument cluster can be produced particularly cost-effectively if, according to another development of the invention, the hinge of the supporting body is a film hinge. It is also possible to connect the supporting body to the basic body in another manner, for example, by screwing, bonding or welding.

As the supporting body is being pivoted over the basic body it is necessarily fixed in its position aligned parallel to the basic body if there is arranged on the rear side of the supporting body at least one latching body aligned transversely to the main direction of extent of said supporting body, and the web has at least one catch for latching to the latching body as soon as the supporting body is in a defined position with respect to the basic body.

The flexible printed circuit board can be positioned on the basic body and the supporting body in a very simple manner if the flexible printed circuit board has a plurality of apertures through which a respective, for example conical body projecting from the basic body or the supporting body protrudes. This conical body is advantageously part of the basic body.

The final and permanent fixing of the flexible printed circuit board can take place without separate fixing means if there are arranged on the flexible printed circuit board indicator drives and/or light boxes which are connected rigidly to the basic body or supporting body. The indicator drives and/or light boxes can grip with latching feet through the flexible printed circuit board and can be latched in the basic body or supporting body. Further clips for holding the flexible printed circuit board may also be present as part of the basic body or supporting body. Finally, dials can be pressed onto the light boxes and the latter can be pressed onto the flexible printed circuit board and in this manner the flexible printed circuit board can be pressed onto the basic body or latching body.

Solder connections for the indicator drives, and/or other components and/or lamps in the light boxes can be dispensed with if, according to another development of the invention, the indicator drives and/or lamps and/or other components have resilient contacts which, in the fitted state, rest resiliently on strip conductors of the flexible printed circuit board.

The indicator drive for the speedometer can be arranged in a particularly simple manner and is covered toward the driver's side if an indicator drive for a speedometer is arranged on the rigid printed circuit board, and the supporting body, in the latched state, covers a region having the indicator drive.

It is particularly expedient for the arrangement in a motor vehicle if a liquid crystal display is arranged on the supporting body because there is then the option of arranging, for example a vehicle navigation system in a central region such that it is readily visible to the driver.

A further advantage of structures of this type resides in the fact that the electrical connection system is separated spatially from electronic components, resulting inter alia in the following advantages:

Improved EMC behavior because of the optimum arrangement of the components.

Easier disentanglement of the layout.

Surface area of cost-intensive printed circuit boards reduced.

Electronics changed without affecting the mechanical structure (design etc.).

BRIEF DESCRIPTION OF THE DRAWINGS

The invention permits various embodiments. To further clarify its basic principle one of these is illustrated in part in a highly schematic manner in the Figures of the drawings and is described below. In the drawings

DETAILED DESCRIPTION OF THE PREFERRED EMBODIMENT

Figure 1:
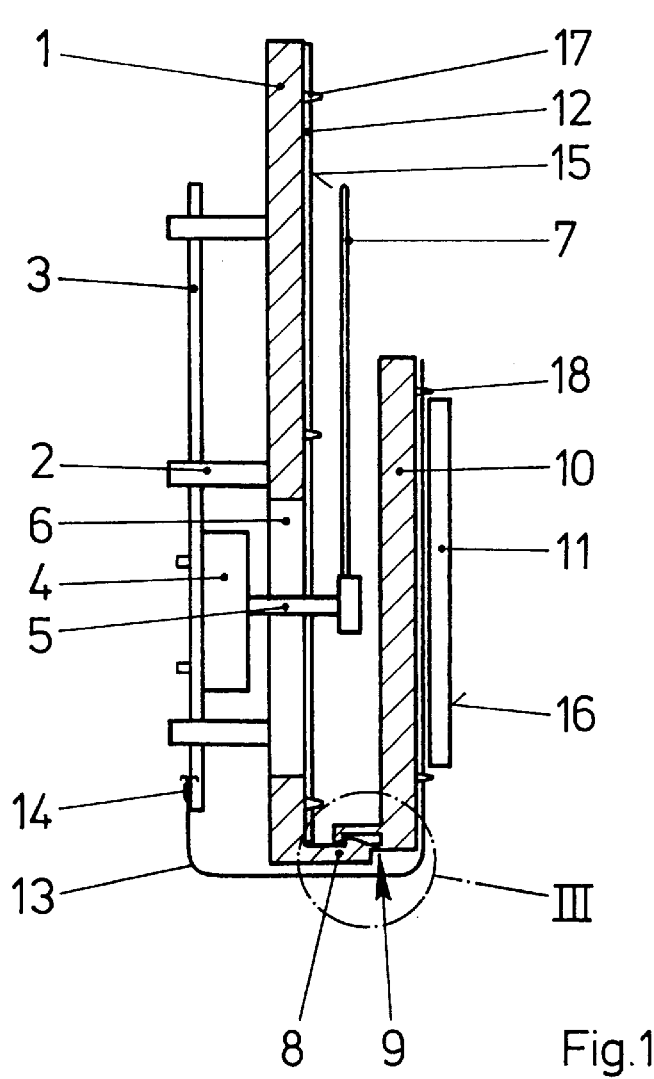
FIG. 1 shows a vertical section through a partly fitted instrument cluster according to the invention.

FIG. 1 shows a basic body 1 of an instrument cluster, said basic body being made of plastic and having, on its rear side, spacers 2 which hold a rigid printed circuit board 3 at a distance from the basic body 1. Fastened on the rigid printed circuit board 3 is, for example among other things, an indicator drive 4 which penetrates by means of an indicator shaft 5 through an aperture 6 of the basic body 1. On the front side of the basic body 1 an indicator 7 is fastened on this indicator shaft 5.

On its lower side the basic body 1 has a web 8 which runs transversely to its main plane of extent and is connected to a supporting body 10 via a hinge 9, which is designed as a film hinge. This supporting body 10 extends parallel to the basic body 1 and covers a region of the basic body 1 containing the indicator shaft 5 and the aperture 6. Arranged on the supporting body 10 is, for example, a liquid crystal display 11 giving the driver visual information, for example, from a vehicle navigation system. The indicator 7 of the instrument cluster according to the invention traverses a first display region 15, while the liquid crystal display 11 forms a second display region 16.

An important feature of the invention is a flexible printed circuit board 12 which extends over the front side of the basic body 1 and of the supporting body 10 and has a connecting region 13 which is bent over by a defined angle, leads to the rigid printed circuit board 3 and is connected to it by means of, for example, bow-type soldering 14. Both the basic body 1 and the supporting body 10 have a plurality of conical bodies, for example 17,18, which penetrate through the flexible printed circuit board 12 and fix the latter in place as a result.

It is also possible for dials (not shown) to press the light boxes onto the flexible printed circuit board 12 and thereby to hold the flexible printed circuit board 12. The dials can be latched to the basic body 1, for example at the edge.

Figure 2:
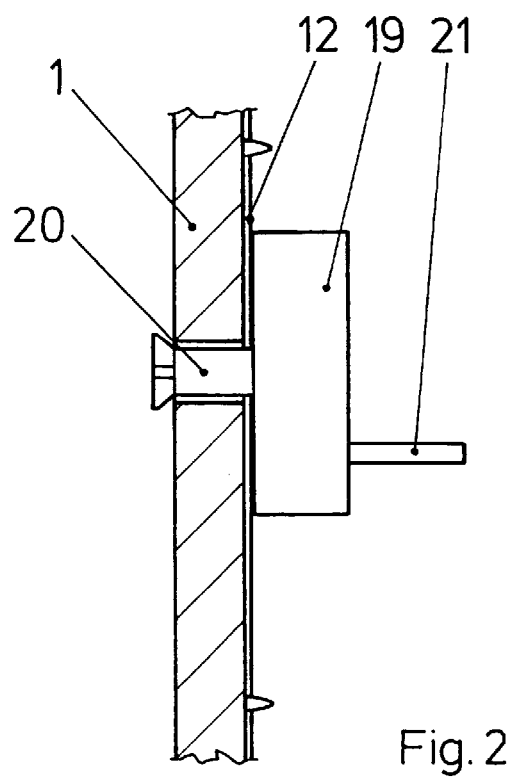
FIG. 2 shows a subregion of the instrument cluster on an enlarged scale compared to FIG. 1.

FIG. 2 shows that there can also be arranged on the flexible printed circuit board 12 indicator drives 19 having an indicator shaft 21, said indicator drives penetrating with latching feet 20 through the flexible printed circuit board 12 and the basic body 1 and being latched on the rear side of the basic body 1. These indicator drives 19 thereby hold the flexible printed circuit board 12 on the basic body 1. Light boxes (not shown) can be arranged and held on the basic body 1 or on the supporting body 10 in a corresponding manner. It is also possible for dials (not shown) to press the light boxes onto the flexible printed circuit board 12 and thereby to hold the flexible printed circuit board 12. The dials can be latched to the basic body 1, for example at the edge. FIG. 2 does not show that the indicator drive 19 has, on its lower side, resilient contacts which rest resiliently on strip conductors of the flexible printed circuit board 12, so that contacting takes place without soldering.

Figure 3:
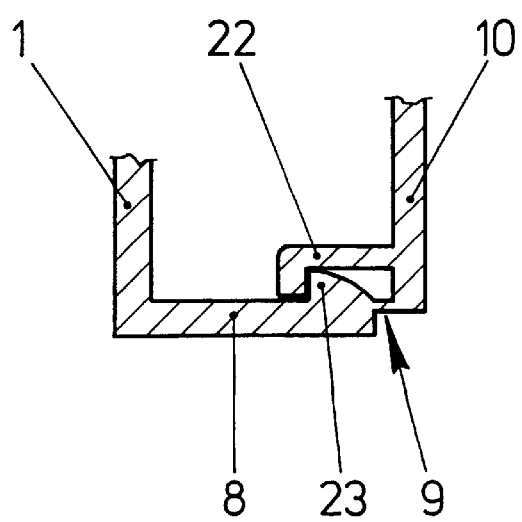
FIG. 3 shows a further subregion of the instrument cluster.

FIG. 3 shows a subregion of the web 8 and of the supporting body 10 connected to it via the hinge 9. It can be seen that the supporting body 10 has a latching body 22 which, in the defined position of the supporting body 10 with respect to the web 8, is snapped over a catch 23 of the web 8 and thereby fixes the supporting body 10 in the angular position illustrated in which it extends with respect to the basic body 1.

Figure 4:
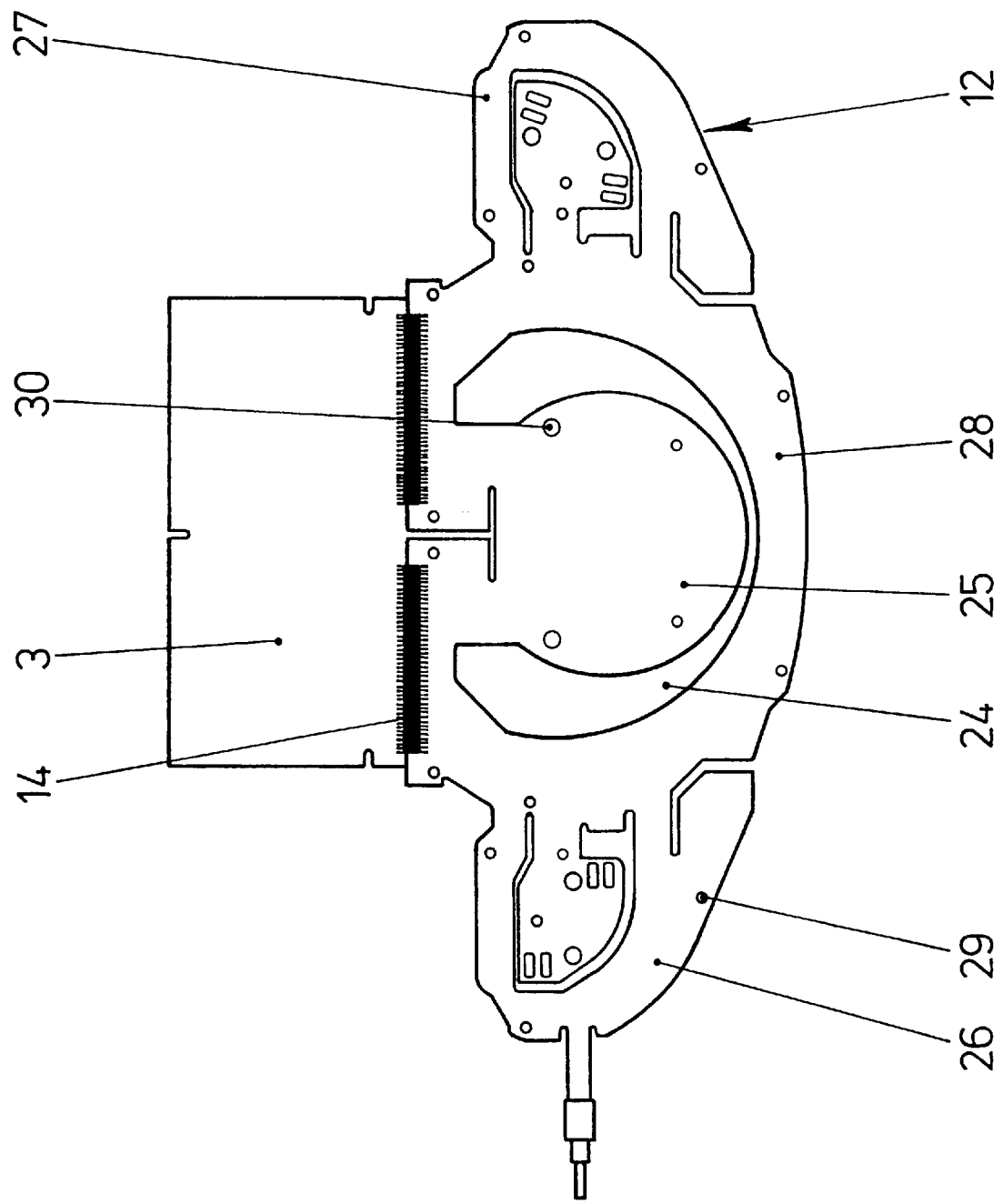
FIG. 4 shows a view of the rigid and flexible printed circuit board of the instrument cluster in the not yet fitted state.

FIG. 4 clarifies how the flexible printed circuit board 12 is connected to the rigid printed circuit board 3 by means of the bow-type soldering 14, for example. Furthermore, a horseshoe-shaped cutout 24 can be seen producing a central region 25 which rests on the supporting body 10 shown in FIGS. 1 and 3. In contrast to this, edge regions 26,27 and a region 28 surrounding the cutout 24 on the outside serve to rest on the basic body 1. By means of this design, the flexible printed circuit board 12 can be adapted in an optimum manner to different angular alignments and different heights of the basic body 1 and the supporting body 10. Apertures 29,30 can likewise be seen in FIG. 4, the conical bodies 17,18 shown in FIG. 1 passing through said apertures in order to fix the flexible printed circuit board 12. The latching feet 20 of the indicator drives 19 can be passed through apertures 31,32.

We claim:

1. An instrument cluster comprising a basic body which supports a rigid printed circuit board on a rear side thereof and has display regions which run at different angles to one another and at least one of which is at a different level with respect to another display region, wherein a flexible printed circuit board (12) is arranged on a front side of the basic body (1), said flekible printed circuit board having a connecting region (13) which is deflected by a defined angle with respect to an edge region of the rigid printed circuit board (3).

2. The instrument cluster as claimed in claim 1, wherein the connecting region (13) is connected to the rigid printed circuit board (3) by bow-type soldering (14), a conductive bond or a zero-force plug.

3. The instrument cluster as claimed in claim 1, wherein the rigid printed circuit board (3) and the flexible printed circuit board (12) are [of integral design] in one-piece as a rigidly flexible printed circuit board.

4. The instrument cluster as claimed in claim 1, wherein the basic body (1) has a web (8) which runs transversely to its main plane of extent and to whose free end a supporting body (10) for at least one second display region (16) is fastened by a hinge (9).

5. The instrument cluster as claimed in claim 4, wherein said hinge (9) of the supporting body (10) is a film hinge.

6. The instrument cluster as claimed in claim 1, wherein a supporting body (10) is rigidly connectable to the basic body (1).

7. The instrument cluster as claimed in claim 4, wherein there is arranged on a rear side of the supporting body (10) at least one latching body (22) aligned transversely to a main direction of extent of said supporting body, and the web (8) has at least one catch (23) for catching to the latching body (22) if the supporting body (10) is in a defined position with respect to the basic body (1).

8. The instrument cluster as claimed in claim 1, wherein the flexible printed circuit board (12) has a plurality of apertures (29,30) through which a respective conical body (17,18) projecting from the basic body (1) or a supporting body (10) protrudes.

9. The instrument cluster as claimed in claim 1, wherein there are arranged on the flexible printed circuit board (12) indicator drives (19), lamps and/or other components which grip with latching feet (20) through the flexible printed circuit board (12) and are latched in the basic body (1) or supporting body (10).

10. The instrument cluster as claimed in claim 9, wherein the indicator drives (19) and/or lamps and/or other components have resilient contacts which, in a fitted state, rest resiliently on strip conductors of the flexible printed circuit board (12) and produce electrical connection.

11. The instrument cluster as claimed in claim 4, wherein an indicator drive (4) for a speedometer another analog display is arranged on the rigid printed circuit board (3), and the supporting body (10), in latched state, covers a region having the indicator drive (4).

12. The instrument cluster as claimed in claim 4, wherein a liquid crystal display (11) and/or other displays is/are arranged on the supporting body (10).

13. The instrument cluster as claimed in claim 1, wherein an electrical connection system is separated spatially from electronic components.

* * * * *